Feb. 21, 1956     E. F. BRADY     2,735,652
CORE TAKING AND ORIENTING METHOD
Filed March 20, 1950     3 Sheets-Sheet 2
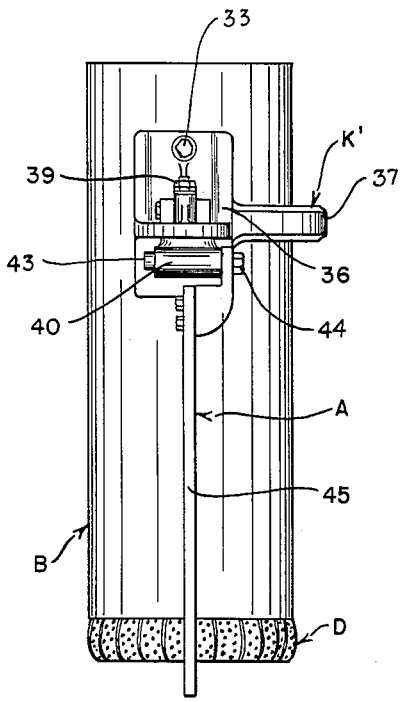
FIG.—4
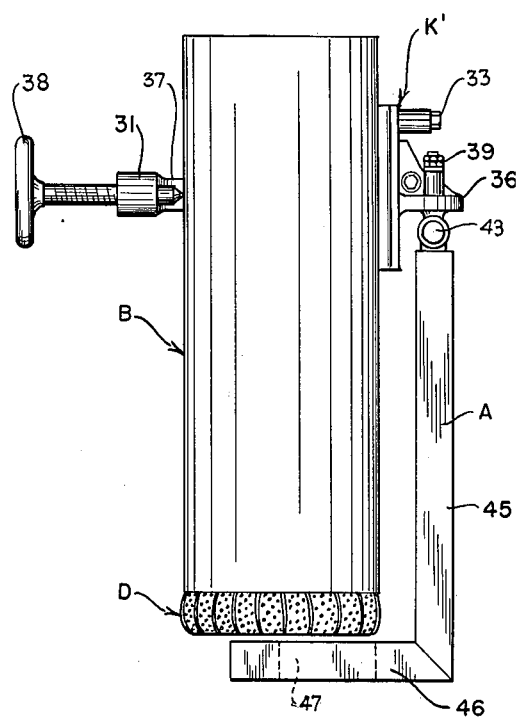
FIG.—5
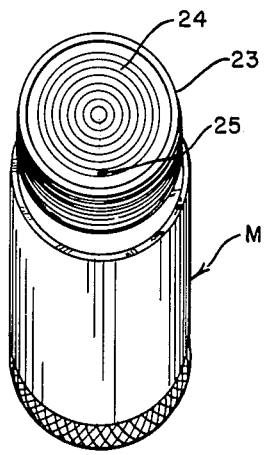
FIG.—7
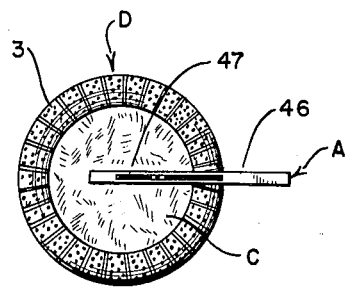
FIG.—6
INVENTOR.
Edward F. Brady
BY
*Lamphere and Van Valkenburgh*
ATTORNEYS Feb. 21, 1956  E. F. BRADY  2,735,652
CORE TAKING AND ORIENTING METHOD
Filed March 20, 1950  3 Sheets-Sheet 3
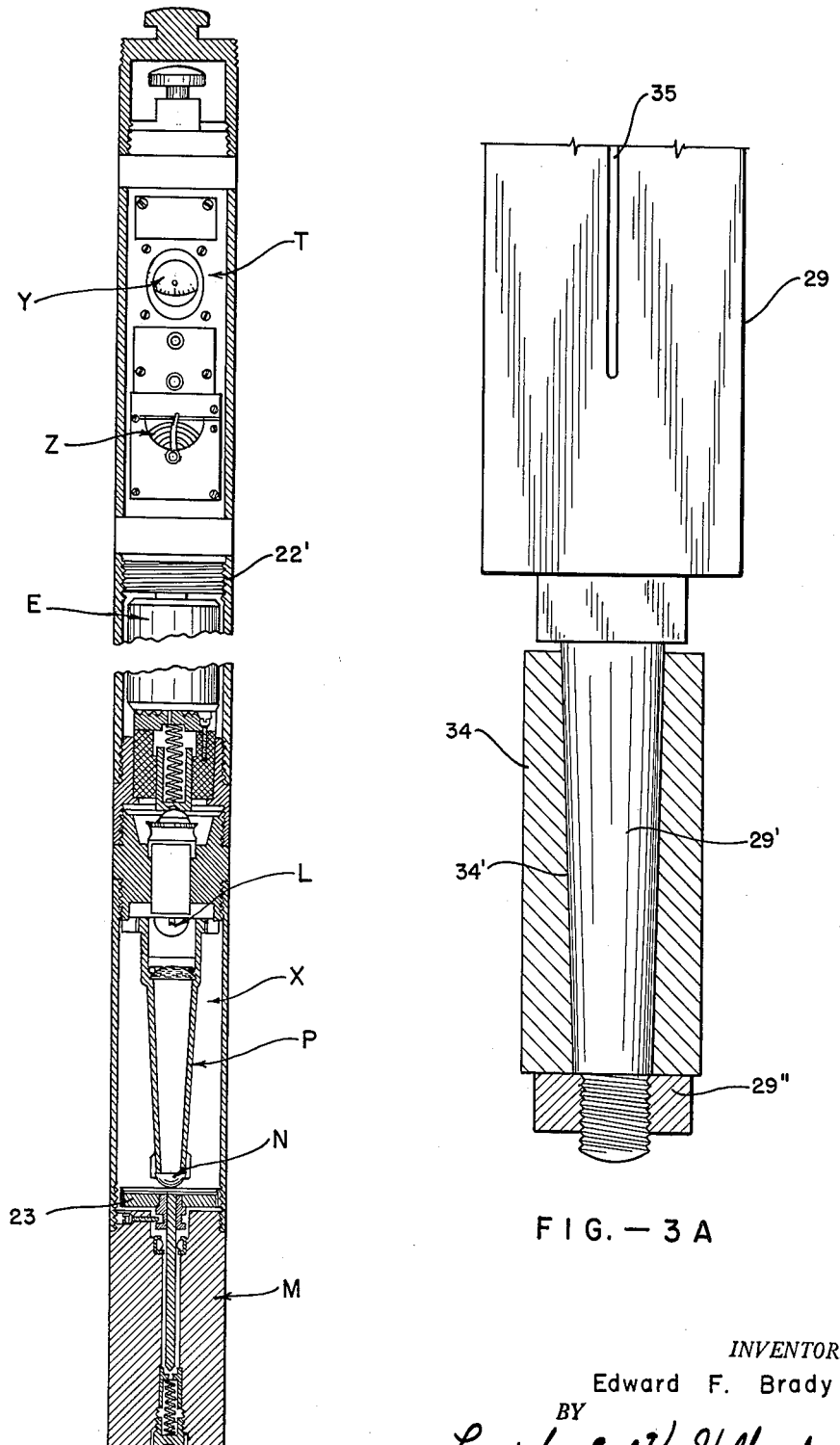
FIG.—1A
FIG.—3A
INVENTOR.
Edward F. Brady
BY
Lamphere and Van Valkenburgh
ATTORNEYS

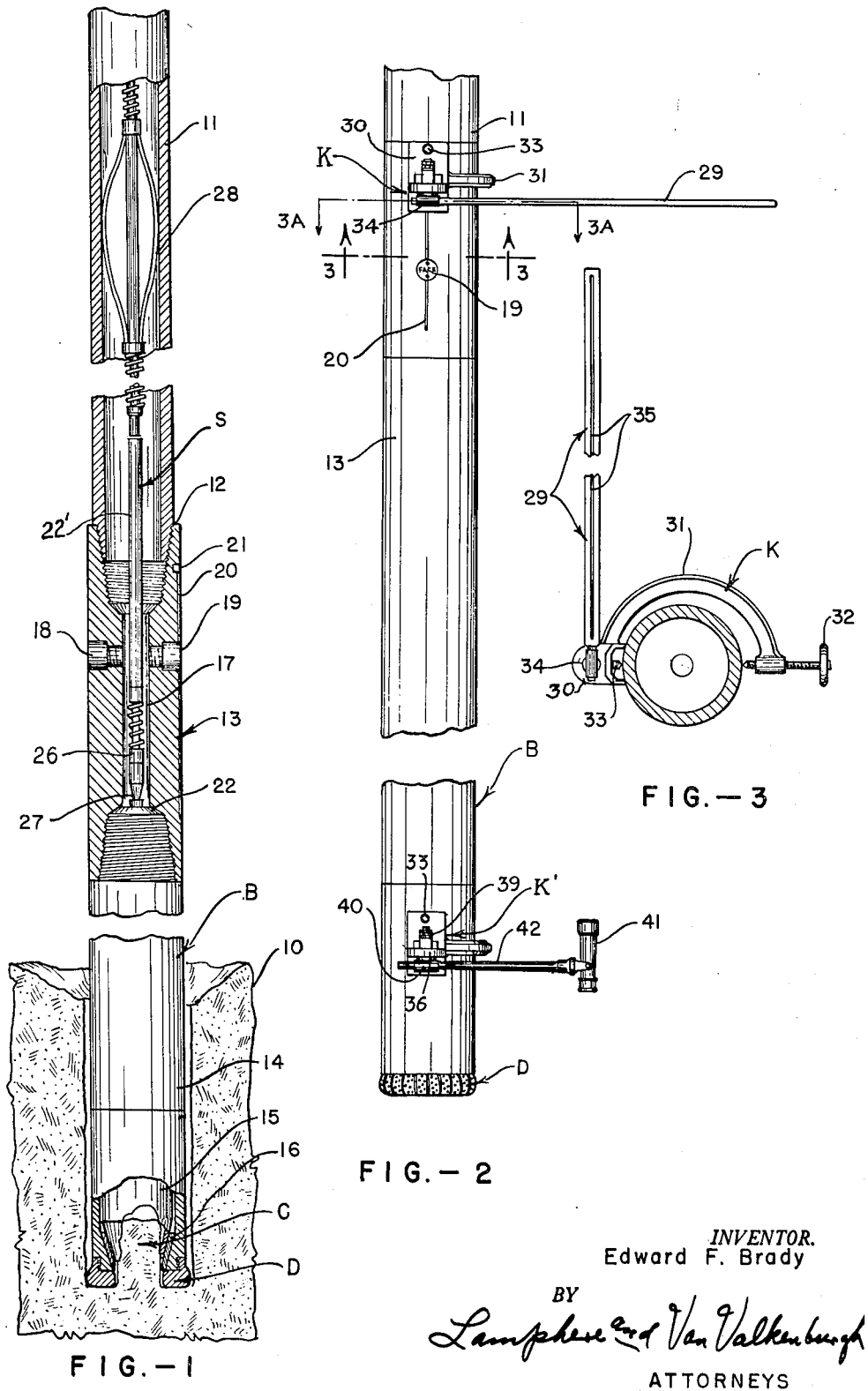

United States Patent Office 2,735,652
Patented Feb. 21, 1956

2,735,652

CORE TAKING AND ORIENTING METHOD

Edward Fay Brady, Long Beach, Calif., assignor to Eastman Oil Well Survey Company, Denver, Colo., a corporation of Delaware Application March 20, 1950, Serial No. 150,720

7 Claims. (Cl. 255—1.4)

This invention relates to the orienting of cores taken from wells during the drilling thereof and more particularly to an improvment in the core orienting apparatus and method disclosed in my United States Patent No. 2,657,013 issued October 27, 1953.

In the drilling of wells, such as oil or gas wells, it is desirable to know certain data about sub-surface strata which is being drilled, such as the dip and strike of such strata, as this information is highly useful in ascertaining if the well is being drilled on structure where oil or gas may be located. To ascertain dip, or dip and strike of strata and to also have knowledge of what formation is being drilled at any particular depth, it is the practice to drill a core which is a cylindrical section cut by a drill from the earth formation. The core is removed from the bore of the well and then by properly orienting it the desired information is obtained. During taking of the core, a survey instrument is used so that data as to the position the core had in the earth can be obtained. When the core is removed it can be, because of the data obtained, again placed in the same position it occupied in the earth's formation from which it was cut. With this orientation, the dip alone or the dip and strike of the strata will become known.

In my above mentioned patent there is disclosed a method of orientation of cores which includes the use of a survey instrument for obtaining information as to the inclination of the hole being drilled and the direction of inclination when the core is taken, which instrument is dropped into the bottom of the well through the drill pipe after the drill pipe is in the hole. The structure disclosed for carrying out the invention includes a specially designed core barrel having means associated therewith at its upper end which will cooperate with the survey instrument and insures a known relationship between the core barrel and the instrument at the time the survey instrument is caused to operate by time mechanism. This specially designed core barrel also requires the use of particularly designed subs in the drill pipe above the core barrel. Thus, it is seen that special designs and equipment are necessary and there may be objection to the use of such in place of conventional equipment long in use because of the cost involved.

Core barrels, that is, barrels in which the core being drilled is received, are generally of two types, one being the "conventional" core barrel and the other a "retractable" core barrel. The conventional core barrel is one which is mounted in the drill pipe in attached association with the core drill. This core barrel, being a part associated with the bottom of the drill pipe, is lowered into the well with the drill pipe. After the core is taken the drill pipe and core barrel are removed from the bore and the core then removed from the core barrel. When such conventional core barrels are used, the survey instrument is also placed in the drill stem in proper association with the core barrel and then lowered with the core barrel and removed with the core barrel. This method of taking the core with a conventional core barrel and operating the survey instrument has been objectionable, as noted in my prior application, because it is necessary to have the survey instrument, which embodied delicate structure, at the bottom of the drill pipe during the entire time the drilling operation takes place. The possibilities of damage, due to heat or jarring, is thus greatly increased and when damage occurs inaccuracies result.

"Retractable" core barrels are of a type which is indicated by the name. These core barrels are run into the drill pipe after the drill stem is placed in the well bore, and associated, in a unitary manner, with these core barrels will be the survey instrument. After the core is taken the core barrel and instrument are removed before the drill pipe is taken from the hole. With these retractable core barrels and the manner of association through survey instruments, the instrument is still subject to suitable jarring and long periods of heat conditions because the instrument is in the hole during the entire taking of the core. Retractable core barrels are employed about fifteen percent of the time and conventional core barrels are employed about eighty-five percent of the time in connection with the taking of cores. Although the specially designed core barrel shown in my said patent can be considered as a modified conventional core barrel, it nevertheless does not permit drillers to use conventional core barrels they may already have and therefore there is this objection to the use of the new method of core orientation involved and has prevented it from having "universal" usage.

One of the objects of this invention is to produce an improved method of taking and orienting a core in which a conventional core barrel is employed.

Another object is to provide means for taking a core and orienting it by use of a conventional core barrel and a survey instrument that can be placed in the well bore through the drill pipe either before or after the core has been drilled.

A further object is to provide core orienting apparatus which will permit the taking of a core wth a conventional core barrel and the recording of data by a survey instrument in order to enable the core to be oriented, all without necessarily being subject to a core drilling time limitation imposed by a time setting of the survey instrument.

Another object is to produce an improved method of taking and orienting a core by the use of a conventional core barrel.

Yet another object is to produce an improved method of taking and orienting a core by the use of a conventional core barrel, a survey instrument placeable in association with the barrel, either before, during or after (whenever desirable) the core is taken and the means for determining the relationship between the core and the record of the instrument after the record is made.

Other objects of the invention will become apparent from the following description taken in connection with the accompanying drawings in which:

Figure 1 is a view of the lower end of a drilling stem of a rotary drilling rig showing structure including a core bit, a conventional core barrel, an orienting sub and a survey instrument employed in carrying out my improved method of core orientation, said structure being shown in the relation present in a well bore after a core is taken and the survey instrument placed in the position;

Figure 1A is a view partly in section showing the major units of the survey instrument.

Figure 2 is a view showing the lower end of drill stem removed from the well bore with an aligning bar and telescope mounted thereon to carry out a step in marking the core so as to know the relation between it and the instrument obtained record when said record was obtained;

Figure 3 is a sectional view taken on the line 3—3 of Figure 2 showing the aligning bar and details of its clamp;

Figure 3A is a sectional view taken on the line 3A—3A of Figure 2 showing the tapered hole mounting.

Figure 4 is a view of the scribe arm and its mounting on the lower clamp to carry out another step in marking the core, said arm being positioned on the same clamp as employed to mount the telescope in the step illustrated in Figure 2;

Figure 5 is another view of the scribe arm and its mounting, said view being taken at right angles to that of Figure 4;

Figure 6 is a bottom view of the drill bit and cut core with the scribe arm in position for marking the core; and Figure 7 is a view of the magnetic orienting unit employed in the recording instrument, said unit carrying the disc upon which the record is made.

Referring to the drawings in detail and first to Figure 1, there is disclosed apparatus for taking a core and obtaining recorded data in connection therewith by a survey instrument while the core taking apparatus remains in the well bore. The well bore which is being drilled in the earth's crust is indicated at 10 and this has been drilled by a drill pipe 11 of a well known rotary drilling rig situated at the earth's surface. When it is desired to take a core and then orient the core, that is, again place it in a position corresponding to the position it occupied in the earth, the drill pipe will be withdrawn from the bore by disconnecting sections and then the regular drill bit removed. To the lower end of the drill pipe will be connected, by a threaded joint 12, a special sub 13 and to the bottom of this special sub is connected the core taking apparatus including a "conventional" core barrel B and a core drill bit D. The core barrel B is shown as one of known construction and comprises an outer barrel 14 (connected to the sub) that may be of several sections and an inner core receiving barrel 15. This inner barrel is suitably mounted in the outer barrel by journals so that said inner barrel can remain stationary while the outer barrel is rotated to rotate the core bid D and cut the core shown at C. The lower end of the core receiving barrel has a suitable core catcher ring 16 whereby when the core is cut and the drill pipe lifted the core can be "broken off" and held in the core barrel while the drill pipe is pulled from the bore.

The special sub 13 has a bore 17 therethrough. Carried by the sub in diametrically opposed relation are two magnetic elements 18 and 19 in the form of screw plugs. As best shown in Figure 2, one of these elements, such as 19, is specially marked, as for example, with the word "Face," and in the surface of the sub is a vertical index line 20 which passes through the center of the "Face" element 19. At the top end of the index line is a centering hole 21.

Between the sub and the core barrel B is mounted a so-called landing plate 22 which will form a support for the bottom of the survey instrument which is shown in Figure 1 and generally indicated by the letter S. This survey instrument may be of any type which can record the inclination of the axis of the well bore, that is, the number of degrees the axis of the well bore at its bottom end is inclined to the vertical. The particular instrument shown by way of example is called a bottom hole orientation (B. H. O.) instrument or drift indicator and is designed to cooperate with the special sub and its magnetic elements so that a known relation will exist between the instrument and the drill pipe when the instrument is operated and a record of data is obtained.

The instrument shown in section in Figure 1A is well known and has a barrel 22' in which is mounted a time control unit T, an angle unit X and a magnetic position indicator M which is shown detached in Figure 7. The magnetic indicator carries a rotatably mounted magnetic disc cup 23 in which is positioned a sensitized disc 24 having concentric circles for degrees. When the instrument is in the position to record data, as shown in Figure 1, it will rest on the landing plate and with such position the magnetic disc cup 23 of the magnetic position indicator M will be between the magnetic elements 18 and 19 and the magnetic disc cup will be pulled into the azimuth of the two permanent magnets.

The angle unit in the instrument as shown in Figure 1A is above the magnetic disc cup and it has a universally mounted plumb bob P with a lens N on its lower end. Above the plumb bob is a lamp L and batteries E for lighting it. The time control unit T is above the lamp and batteries and comprises a settable clock mechanism Y for closing a switch Z to light the lamp. When the lamp is lighted, rays of light pass through the lens on the bottom of the plumb bob and "burn" a dot on the sensitized disc 24, this dot being shown at 25 in Figure 7. The position of the dot gives the angle of inclination of the well bore and will be toward the low side of the hole.

The instrument S also has a shock absorber 26 associated therewith. The bottom of the instrument also has a pointed end 27 for engaging the landing plate and making a mark thereon which will indicate that the instrument was in proper position at the time it operated. The upper end of the instrument S has a stibilizer 28 for guiding and braking it as it is "go-deviled" down the drill pipe. If desired, the instrument could be lowered on a line. When the instrument reaches the bottom it will engage the landing plate with sufficient force to mark it.

As the coring apparatus and survey instrument shown in Figure 1 are presently being used a small amount of core will first be cut with the instrument out of the drill pipe. This is done to test the strata from which the core is to be taken and see how well any cut core remains attached at its bottom with the strata. After this is done, if such is found desirable, the necessary manipulations are performed at the drilling rig and the instrument placed in the drill pipe. Before lowering the instrument its time clock is set so as to allow sufficient time to elapse to get the instrument in the well (by "go-deviling" or by a line) and set, as shown in Figure 1, also to allow for sufficient time to drill a desired length of core, together with time to allow the plumb bob to come to rest.

The apparatus and survey instrument can also be so employed that the instrument will not be placed in the drill pipe until after all the desired core has been drilled. This is a highly desirable step, but with present drilling equipment has been difficult because of the necessity of disconnecting the "kelly" after the core is cut to get the instrument in the drill pipe. When the "kelly," with its present structure, is disconnected it is necessary to "break off" the core. Thus, to put the instrument in to obtain data after the core is taken would be difficult because it must be certain when the instrument is operated the core should not as yet be "broken off." These steps have been accomplished, but they cannot be as yet made regular procedure, notwithstanding that it means no drilling will be done while the instrument is in the drill pipe and the elapsed time for instrument operation is a minimum.

After the survey instrument is operated when the set time has elapsed, core C is "broken off" and the drill pipe, instrument, sub and core barrel pulled out of the well bore. During "breaking off" of the core and the pulling of the drill pipe, the core and the outer barrel will be connected together by way of the core catcher structure. Thus, there will be no relative movement which will change the position of the core with respect to the drill pipe from that at which the recorded data was obtained by the operation of the instrument.

Referring now to Figures 2 to 6, inclusive, wherein additional steps in my improved method are disclosed, the sub 13, as it comes out of the well bore on pulling the drill pipe to bring up the core, has attached thereto a clamp K on which will be mounted a sighting bar 29. This clamp K has a body portion 30 to which is attached a semi-circular arm 31 to go around the sub. On the free end of the arm is a hand screw 32, by means of which the body can be clamped to the sub. The body has a spring biased plunger 33 which has an end extending slightly from the body member. This plunger is for co-operation with the already referred to centering hole 21 in the sub at the upper end of the index line 20. By placing the clamp so the end of the plunger 33 goes into the hole 21 there is assurance that the clamp will be properly positioned with respect to the index line. Also on the body of the clamp is an attaching member 34 for attaching the sighting bar 29 in proper position. The sighting bar will be so attached that when on the sub as described, the plane in which its sighting line 35 extending longitudinally thereof will be positions is assured of being at right angles to the axis of the sub 13 and, therefore, to the index line 20. Since the index line passes through the center of magnet 19, the sighting bar line will thus also be at right angles to the vertical plane passing through the two magnets in the sub. As shown in Figure 3A, the member 34 has a tapered hole 34' into which a tapered pin 29' on the end of the sighting bar will be mounted and firmly held by nut 29".

After the clamp K with the sighting bar attached is mounted on sub 13, as shown in Figures 2 and 3, the sub 13 and core barrel are raised into the drilling rig derrick to where the core bit is just above a person's head. To the bottom of the core barrel is now attached a second clamp K'. This clamp is similar to the K clamp, having a body 36 and arm 37 and a clamping hand screw 38. On this clamp body is an attaching bolt 39 having a head 40 provided with a tapered opening. Mounted on the clamp is a telescope 41, the mounting being by a rod 42, the end of which fits into the tapered opening in the head 40 of the bolt 39. The tapered opening and tapered end mounting are the same as disclosed in Figure 3A.

With this telescope sighting up the barrel, the placing of the axes of the two tapered openings in the two clamps K and K' is accurately accomplished. The telescope is sighted at the line on the sighting bar held by clamp K. Adjustment is made by shifting clamp K' until the axis of the tapered hole in the head 40 of the bolt is made to be parallel with the line of the sighting bar. When this is accomplished, the telescope and its mounting rod 42 is removed from the clamp K'.

In place of the telescope there is now attached to the clamp K' a special scribe arm A which is shown in Figures 4, 5 and 6. This scribe arm has an attaching tapered pin 43 secured to a member 44. Attached to this member 44 is the main part of the scribe arm comprising a member having two arms 45 and 46 at right angles to each other. The arm 46 has therein a slot 47, as is clearly shown in Figure 6. The attaching of the arms 45 and 46 to the tapered pin by the member 44 is such that when the pin is placed in the tapered hole of the clamp K', arm 45 will extend down the lower end of the barrel B with its longitudinal center line in alignment with the index line 20 and the arm 46 will extend across the open bottom end of the drill with the slot 47 passing through the core axis and being parallel with the diametrical line between the two magnetic elements 18 and 19. With the scribe arm in this position, all as shown in Figure 6, a scribing tool can be inserted in slot 47 and a mark drawn across the bottom surface of the core C. This mark will be from the axis of the core toward the side corresponding to the index line. Thus it will be known which side of the core was on the side toward the index line when the instrument was operated.

The core can now be removed from the core barrel and it is ready to be oriented, that is, placed in a position corresponding exactly to that position it had in the earth before it was cut. This can be done by the use of a surface reader, an instrument well known in orienting cores. This reader will have a pair of diametrically positioned permanent magnets corresponding to those at 18 and 19 on the sub 13. The magnetic position indicator M, shown in Figure 7, will be removed from the survey instrument S and placed in the reader between the two magnets thereof. The magnetic disc cup will then assume the identical position it had in the sub between magnets 18 and 19 and it will then be known what the position of the sensitized disc was when the dot 25 was made by operation of the instrument. Since the core which was taken was scribed and the scribe mark had a definite relation to the magnet 19, it will then be known from the dot 25 which is the low side of the core, or that side which was at the low side of the hole. The core can now be oriented by placing it in a special reader as the direction of inclination of the bore hole at which the core was taken is known. This is obtainable either before or after the taking of the core by running in on a line a special instrument for obtaining such data. After orienting the core, the dip and strike of the formation from which the core was taken will become known.

By the use of my method of taking a core and obtaining data as to the inclination of the core, all as described, it is believed to be obvious that the method is simple and the apparatus employed is also simple and easily used. The method permits the use of a conventional core barrel structure which, as already noted, is employed in about eighty-five percent of core taking procedure. The survey instrument employed is well known, being a simple drift indicator. The instrument can be placed in the well bore before, during or after the core is taken. If done after the core is taken, then it will eliminate any necessity of subjecting the instrument to possible damage by any core drilling operation and also to prolonged high heat which becomes present during drilling and also because of great depths. The sub 13 employed in the drill string is easily inserted and is a rugged unitary structure.

The particular steps of the method described are preferable, but it is to be understood that changes can be made if desired without departing from the invention. For example, the instrument need not be left in the drill pipe after being operated and removed from the well bore with the drill pipe. It may be retrieved as soon as it operates by employing a retrieving line or the retrieving line can be attached after operation by employing an overshot on the end of the line for connecting with a spear head on the top of the instrument. Therefore, in view of possible modifications without departing from the fundamental principles and steps of my invention, it is to be understood that said invention is not to be limited in any manner except in accordance with the appended claims.

What is claimed is:

1. In a method of taking and orienting a core by the use of a core barrel movable into and out of a bore with a drill pipe and core drill bit and by the use therewith of a drift indicator instrument of the magnetic type operable to obtain data when having a predetermined position with respect to permanent magnets carried by the drill pipe, said method comprising the taking of the core by rotating the drill pipe, making a recording of the inclination of the axis of the core while the bottom of the core is attached to the earth and undisturbed with respect to the position it has in the earth, removing together the drill pipe and core from the bore after the core is broken from the earth, and then marking the core while undisturbed in the core barrel and in such a manner that its relationship with one of the permanent magnets and thereby the obtained record at the time the record was made will be known after the core is removed from the core barrel.

2. In a method of taking and orienting a core by the use of a core barrel movable into and out of a bore with a drill pipe and core drill bit and by the use therewith of a drift indicator instrument of the magnetic type operable to obtain data when having a predetermined position with respect to diametrically opposed permanent magnets carried by the drill pipe, said method comprising the taking of the core by rotation of the drill pipe, making a recording of the inclination of the axis of the core while the bottom of the core has the same position in the earth as it had before cutting and is attached to the earth, removing the drill pipe, the core barrel and core simultaneously from the bore after breaking off the core from the earth and without disturbing the position of the core in the core barrel from that at which it has when the record was made, locating an instrument adjacent the core and in such a position that a straight edge thereof is in a plane passing through the longitudinal axis of the core and the diametrical line between the magnets, and then scribing the core by use of the straight edge while undisturbed in the core barrel so that the relationship between the obtained record and the core will be known after the core is removed from the core barrel.

3. In a method of taking and orienting a core by the use of a core barrel movable into and out of a bore with a drill pipe and core drill bit and by the use therewith of a drift indicator instrument of the magnetic type operable to obtain data when having a predetermined position with respect to diametrically opposed permanent magnets carried by the drill pipe, said method comprising the taking of the core by rotation of the drill pipe, making a recording of the inclination of the axis of the core while the bottom of the core is still attached to the earth and has the same position in the earth as it had before cutting, removing together the drill pipe, the core barrel and core from the bore after breaking the core from the earth and without disturbing the core in the core barrel, and then marking the bottom of the core while undisturbed in the core barrell by a scribe line which will have the same radial direction as a radial line between the axis of the drill pipe and one of the diametrically opposed permanent magnets whereby when the core is removed its relation will be known to the record when obtained.

4. In a method of taking a core in an earth bore by a drill pipe, core drill bit and core receiving barrel which is movable in and out of the bore with the drill pipe, obtaining data with respect to the position the core had in the earth's formation and conditioning said core by placing thereon suitable indicia so that orientation can be accomplished, said method comprising cutting the core by rotating the drill pipe and receiving it in the core barrel, obtaining a record of the inclination or drift of the axis of the bottom of the bore at which the core is taken while the bottom of the core is still attached to the earth and undisturbed with respect to the position it has in the earth and also the relationship between the obtained record and a known point on the drill pipe at the time of obtaining the record, breaking the bottom of the core from the earth, removing from the bore the drill pipe, core barrel and core therein, and then placing on the core while undisturbed in the core barrel an indicia showing the position the core had with respect to the said known point on the drill pipe.

5. In a method of taking a core in an earth bore by a drill pipe, core drill bit and core receiving barrel which is movable in and out of the bore with the drill pipe, obtaining data with respect to the position the core had in the earth's formation and conditioning said core by placing thereon suitable indicia so that orientation can be accomplished, said method comprising cutting the core by rotating the drill pipe and receiving it in the core barrel, obtaining by a magnetic type of survey instrument in the drill pipe and magnets carried by the pipe of a record of the inclination or drift of the axis of the bottom of the bore at which the core is taken while the bottom of the core is attached to the earth and undisturbed with respect to the position it has in the earth and also the relationship between the record obtained and the magnets carried by the drill pipe at the time of obtaining the record, removing from the bore the drill pipe, core barrel and core therein after breaking the bottom of the core from the earth, and then placing on the core while undisturbed in the core barrel an indicia showing the position the core had with respect to the said magnets carried by the drill pipe.

6. In a method of taking a core in an earth bore by a drill pipe, core drill bit and core receiving barrel which is movable in and out of the bore with the drill pipe, obtaining data with respect to the position the core had in the earth's formation and conditioning said core by placing thereon suitable indicia so that orientation can be accomplished, said method comprising cutting the core by rotating the drill pipe and receiving it in the core barrel, obtaining a record of the inclination or drift of the axis of the bottom of the bore at which the core is taken while the bottom of the core is still attached to the earth and undisturbed with respect to the position it has in the earth and also the relationship between the obtained record and a known point on the drill pipe at the time of obtaining the record, breaking the bottom of the core from the earth, removing from the bore the drill pipe, core barrel and core therein, and then placing on the bottom surface of the core while undisturbed in the core barrel a scribed radial line lying in a longitudinal plane passing through the known point on the drill pipe and the axis of the drill pipe.

7. In a method of taking a core in an earth bore by a drill pipe, core drill bit and core receiving barrel which is movable in and out of the bore with the drill pipe, obtaining data with respect to the position the core had in the earth's formation and conditioning said core by placing thereon suitable indicia so that orientation can be accomplished, said method comprising cutting the core by rotation of the drill pipe and receiving it in the core barrel, obtaining a record of the inclination or drift of the axis of the bottom of the bore at which the core is taken while the bottom of the core is still attached to the earth and undisturbed with respect to the position it has in the earth, and also the relationship between the record obtained and a known point on the drill pipe above the core at the time of obtaining the record, removing from the bore the drill pipe, core barrel and core therein after breaking the core from the earth, positioning a scribing edge on the drill pipe at the bottom of the drill pipe so that the edge will be radially positioned over the bottom surface of the core with the edge extending in the same direction as the radial line intersecting the known point, and then scribing the bottom surface of the core by the edge as a guide.

References Cited in the file of this patent

UNITED STATES PATENTS

| | | |
|---|---|---|
| 1,841,790 | Culberton | Jan. 19, 1932 |
| 1,864,113 | Anderson | June 21, 1932 |
| 1,935,078 | Cavins | Nov. 14, 1933 |
| 2,034,257 | Hampton | Mar. 17, 1936 |
| 2,147,544 | Potts | Feb. 14, 1939 |
| 2,197,062 | Sweet et al. | Apr. 16, 1940 |
| 2,292,838 | Jones | Aug. 11, 1942 |
| 2,489,566 | Engle | Nov. 29, 1949 |
| 2,544,979 | Brokaw et al. | Mar. 13, 1951 |